US012672727B2

(12) United States Patent
Wigington

(10) Patent No.: US 12,672,727 B2
(45) Date of Patent: Jul. 7, 2026

(54) SYSTEMS AND METHODS FOR INTEGRATED FRAME MIRROR

(71) Applicant: The Carpenter Company, Boise, ID (US)

(72) Inventor: Traci Wigington, Boise, ID (US)

(73) Assignee: The Carpenter Company, Boise, ID (US)

( * ) Notice: Subject to any disclaimer, the term of this patent is extended or adjusted under 35 U.S.C. 154(b) by 228 days.

(21) Appl. No.: 18/371,117

(22) Filed: Sep. 21, 2023

(65) Prior Publication Data

US 2024/0358173 A1      Oct. 31, 2024

Related U.S. Application Data

(60) Provisional application No. 63/498,738, filed on Apr. 27, 2023.

(51) Int. Cl.
*A47G 1/00* (2006.01)
*C03C 15/00* (2006.01)
(52) U.S. Cl.
CPC ............... *A47G 1/00* (2013.01); *C03C 15/00* (2013.01)
(58) Field of Classification Search
CPC .. A47G 1/00; A47G 1/06; C03C 15/00; C03C 15/025
See application file for complete search history.

(56) References Cited

U.S. PATENT DOCUMENTS

| | | | | |
|---|---|---|---|---|
| 4,978,207 | A * | 12/1990 | Gillner ...................... | G09F 7/18 |
| | | | | 248/488 |
| 5,453,680 | A * | 9/1995 | Giolma ................... | G05F 3/267 |
| | | | | 327/536 |
| 7,824,074 | B2 * | 11/2010 | Liou ......................... | H04N 5/72 |
| | | | | 362/140 |
| 9,423,156 | B2 * | 8/2016 | García-Conde Noriega et al. ...... | |
| | | | | F24S 23/74 |
| 9,638,395 | B2 * | 5/2017 | Pun ......................... | H01H 13/83 |
| 10,016,045 | B1 * | 7/2018 | Hollinger ............... | A45D 42/00 |
| 11,026,497 | B2 * | 6/2021 | Yang ....................... | A45D 42/10 |
| 11,549,680 | B2 * | 1/2023 | Feit ......................... | F21V 23/005 |
| 11,708,031 | B2 * | 7/2023 | Yang ....................... | A45D 42/00 |
| | | | | 359/838 |
| 12,140,301 | B1 * | 11/2024 | Liu ....................... | F21V 23/0485 |
| 12,396,577 | B2 * | 8/2025 | Wong ..................... | A45D 42/10 |
| 2004/0192063 | A1 * | 9/2004 | Koike ..................... | B24B 49/12 |
| | | | | 438/689 |
| 2020/0278514 | A1 * | 9/2020 | Yang ......................... | F21V 3/02 |

* cited by examiner

*Primary Examiner* — Chi Q Nguyen
(74) *Attorney, Agent, or Firm* — Parsons Behle & Latimer

(57) ABSTRACT

Disclosed embodiments include systems and methods for making an integral frame mirror having a reflective layer with a first perimeter, a glass layer positioned on top of the reflective layer wherein the glass layer has a second perimeter that extends beyond the first perimeter of the reflective layer, and a integral frame positioned in between the first perimeter of the reflective layer and the second perimeter of the glass layer.

5 Claims, 4 Drawing Sheets

100

102

104 {

104a
·
·
·
104n

100

106

104

102

100

108

102

100

110

104

102

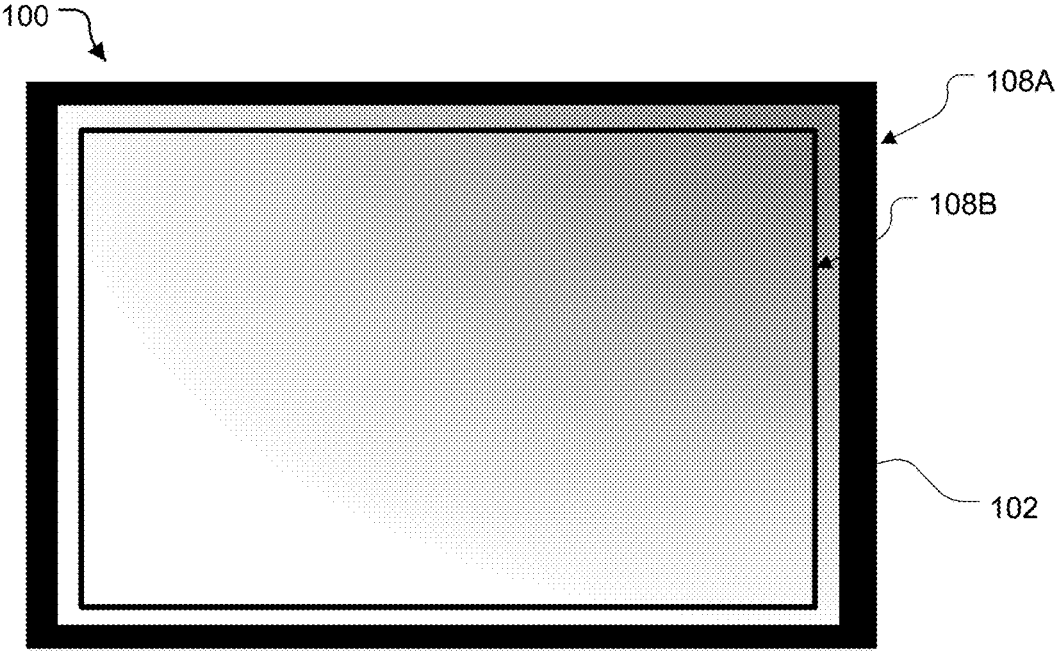
FIG. 5
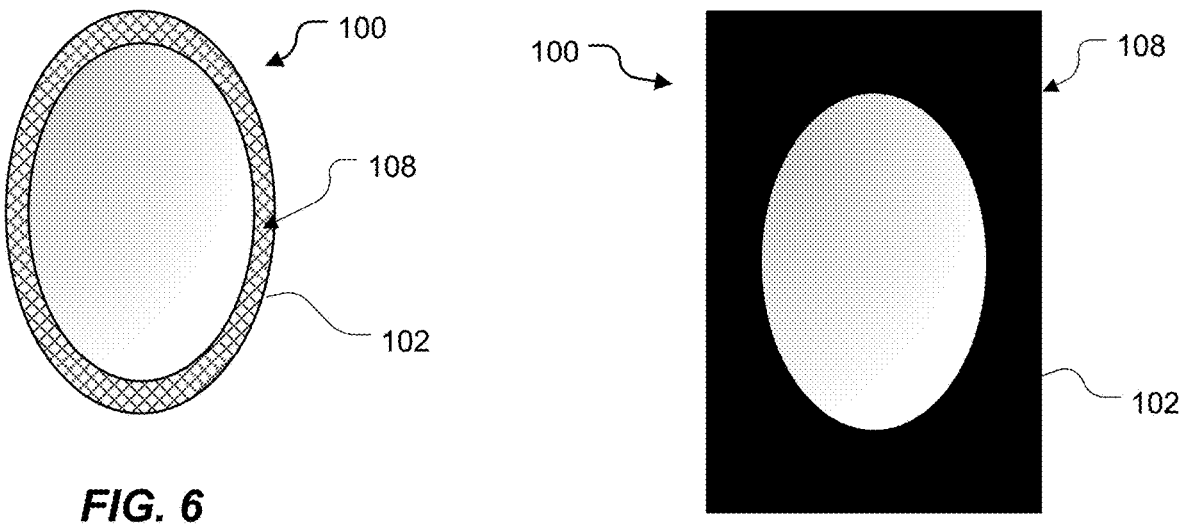
FIG. 6                    FIG. 7

SYSTEMS AND METHODS FOR INTEGRATED FRAME MIRROR

CROSS-REFERENCE TO RELATED APPLICATIONS

This application, under 35 U.S.C. § 119, claims the benefit of U.S. Provisional Patent Application Ser. No. 63/498,738 filed on Apr. 27, 2023, and entitled "Structure Free Mirror Frame," the contents of which are hereby incorporated by reference herein.

FIELD OF THE DISCLOSURE

This disclosure relates generally to systems and methods for providing the appearance of a frame or border on a glass or glass-like surface. More particularly, this disclosure relates to systems and methods for systems and methods for providing the appearance of an integral frame or border on a mirror.

BACKGROUND

A typical mirror utilizes a pane of glass with a reflective backing. This reflective backing is typically applied as a coating or sheet applied to the rear surface of the glass. The coating is made of a metallic substance such as silver or aluminum that reflects light back through the glass.

Often mirrors utilize a frame. Typical frames can be metal, wood, plastic, or the like applied around the edge of the mirror. This frame typically conceals or abuts the outer edges of the mirror to provide a frame around the mirror. Depending upon factors such as the frame material, size, environment where the mirror is displayed, and the like, a frame can be costly, inconvenient, or otherwise undesirable. Likewise, existing frames are typically made from 4 or more pieces that join at the corners. Over time corners can separate and look less attractive.

Conversely, it is often undesirable to hang or otherwise display a mirror without a frame as it can look unfinished or cheap. Additionally, when a mirror is placed in a bathroom or other wet or humid environment, wood frames and the like can become moldy or develop other unsanitary issues. Further, a frame around the edge of a mirror makes the mirror more difficult to clean and often requires separate cleaners of its own. Other drawbacks, inconveniences, and issues also exist for current systems and methods for providing a frame or the appearance of a frame on a mirror.

SUMMARY

Accordingly, disclosed embodiments address the above, and other, drawbacks, inconveniences, and issues that exist for current systems and methods of providing a frame or the appearance of a frame on a mirror.

Disclosed embodiments include a mirror and process for making a mirror having an integral frame. In embodiments of the method, a typical mirror pane is provided. A typical mirror pane has the metallic coating or reflective layer extending on the backside of the mirror to each edge of the mirror. This metallic coating is abrasively or otherwise removed to provide an edge of the back surface that is free of metallic or reflective coating. The edge that is free of metallic coating is then painted or otherwise decorated in whichever color or manner is intended to be the integral frame feature of the mirror. The process provides the appearance of a frame without physically positioning a frame on the glass. The color is seen through the glass of the mirror and instead of reflecting back the light through the mirror, instead the color or other decoration of the frame is seen through the edge of the mirror. A variety of frame sizes is contemplated using this process. These frame sizes can be dependent on the aesthetic choice of the frame creator or of a purchaser such as a homeowner or designer. The frame options can vary in width and shape and also due to the size of the mirror. The mirror can be either provided with edge free of reflective surface or the reflective surface can be removed. Preferably a mechanical abrasion is utilized for example, a beveling machine that is typically used for beveling the front edge of the mirror can be used to remove the silver coating. Disclosed embodiments enable a mirror manufacturer to avoid the cost, expense, and time of creating an actual frame utilizing wood or other materials. Further, the integral frame provides a minimalist appearance without any projections or extending edges. The integral frame also reduces material use and labor costs compared with building a true mirror frame. Other advantages also exist.

Disclosed embodiments include an integral frame mirror having a reflective layer having a first perimeter, a glass layer positioned on top of the reflective layer wherein the glass layer has a second perimeter that extends beyond the first perimeter of the reflective layer, and an integral frame positioned in between the first perimeter of the reflective layer and the second perimeter of the glass layer.

In some embodiments the integral frame is a decorative feature. In some embodiments the decorative feature is paint.

In some embodiments the integral frame is positioned on a back surface of the glass layer.

Also disclosed are methods of making an integral frame mirror, the methods including removing a portion of a reflective layer on the rear side of a mirror, wherein the removed portion extends substantially around a perimeter of the mirror and applying a decoration within the removed portion of the reflective layer.

In some embodiments the step of removing the portion of the reflective layer further includes mechanically abrading a portion of the reflective layer from the rear side of the mirror. In some embodiments the step of removing the portion of the reflective layer further includes chemically removing a portion of the reflective layer from the rear side of the mirror. In some embodiments the step of removing the portion of the reflective layer further includes thermally removing a portion of the reflective layer from the rear side of the mirror.

In some embodiments the step of applying a decoration includes applying paint. Other embodiments also exist.

BRIEF DESCRIPTION OF THE DRAWINGS

FIG. 5 is a schematic, front-side view of a mirror with an integral frame in accordance with disclosed embodiments.

FIG. 6 is a schematic, front-side view of a mirror with an integral frame in accordance with disclosed embodiments.

FIG. 7 is a schematic, front-side view of a mirror with an integral frame in accordance with disclosed embodiments.

Figure 1:
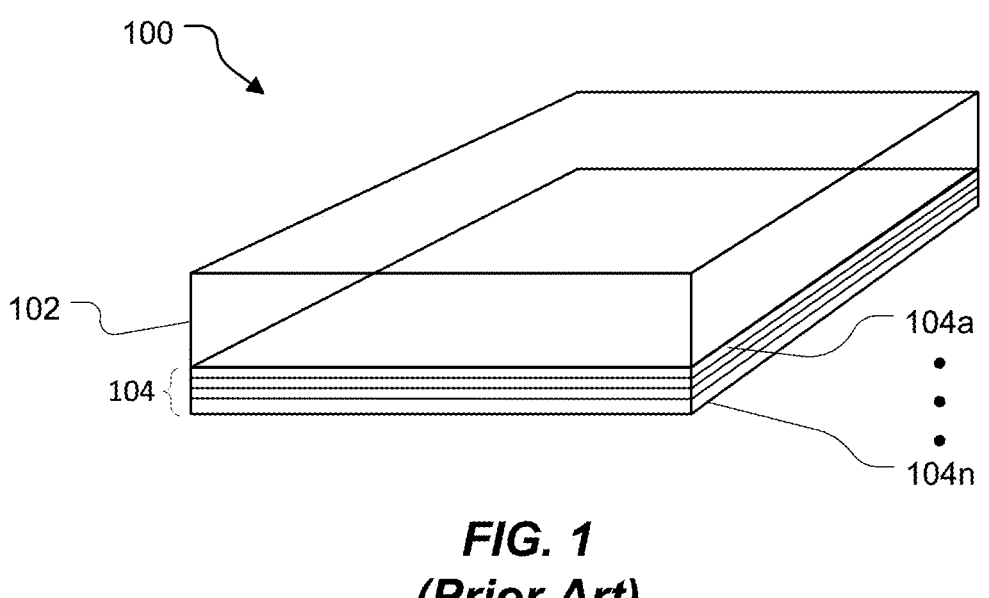
FIG. 1 is a schematic isometric view of a typical mirror as is known in the prior art.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is a schematic, isometric view of a typical mirror 100 as is known in the prior art. As illustrated a typical mirror 100 includes a glass or glass-like (e.g., plastics, acrylics, and the like) layer 102 and a reflective layer 104. As also illustrated (and not drawn to scale) reflective layer 104 may comprise one or more layers 104a, . . . , 104n that include a reflective layer (typically, 104a) comprising a metal or metallic-like layer (e.g., silver, chrome, aluminum, etc.) and one or more backing or protective layers (e.g., 104n) that may comprise several coats of paint, or the like, to protect the back surface of the mirror 100. As shown, reflective layer 104 extends across the entire back surface of glass layer 102.

Figure 2:
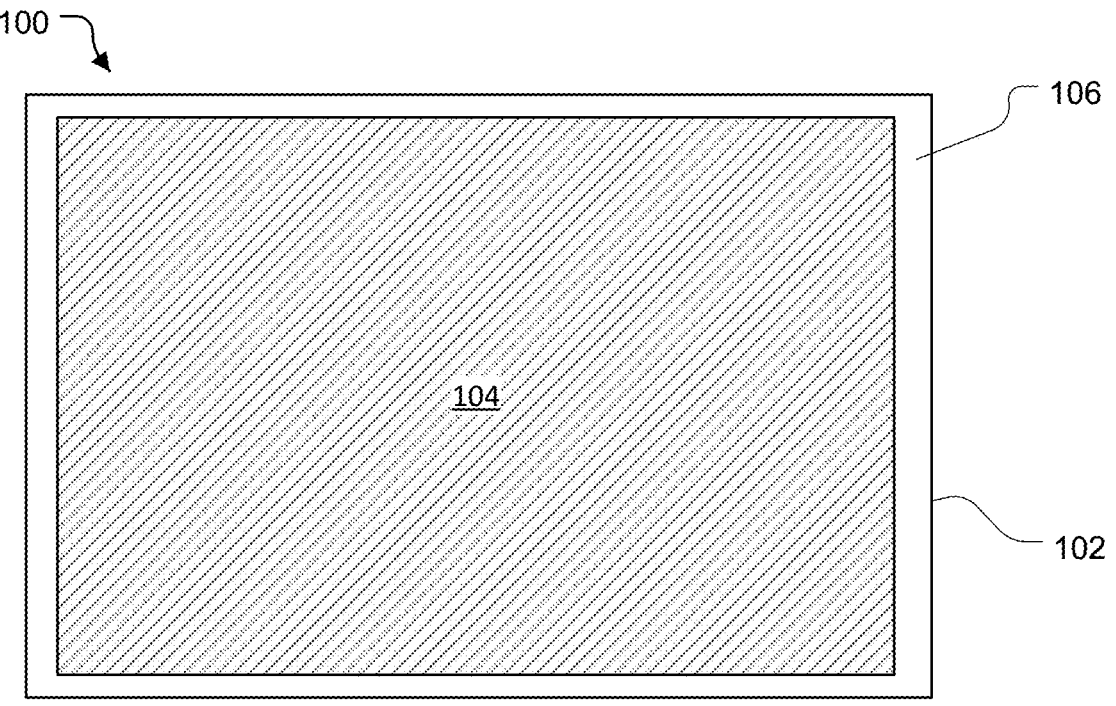
FIG. 2 is a schematic, rear-side view of a mirror with a portion of a reflective layer removed in accordance with disclosed embodiments.

FIG. 2 is a schematic, rear-side view of a mirror 100 with an exposed portion 106 of reflective layer 104 that has been removed in accordance with disclosed embodiments. As illustrated, removal of the reflective layer 104 leaves glass layer 102 exposed on the reflective layer 104, or back, side of the mirror 100.

In some embodiments exposed portion 106 may be formed by removal of parts of reflective layer 104 by mechanical abrasion (i.e., sanding or grinding the reflective layer 104 off the glass layer 102) using hand tools or powered machinery. In some embodiments, a beveling machine (not shown) that is typically used for beveling the front edges of a mirror may be used to remove the reflective layer 104 by mechanical abrasion. Other embodiments may form exposed portion 106 by chemical removal (e.g., solvents), masking during manufacturing (e.g., blocking the deposition or other placement of the reflective layer 104 in a desired area), application of heat (i.e., melting), or the like. Combinations of the foregoing (e.g., solvents and sanding) may also be used to form exposed portion 106.

Figure 3:
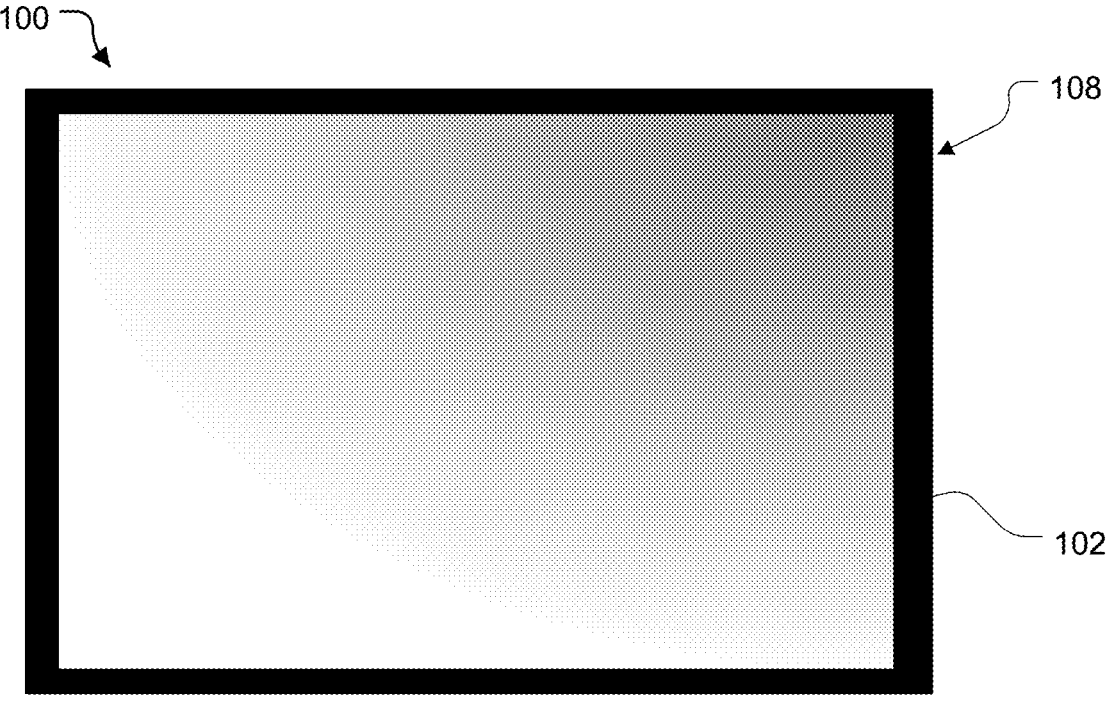
FIG. 3 is a schematic, front-side view of a mirror with an integral frame in accordance with disclosed embodiments.
Figure 4:
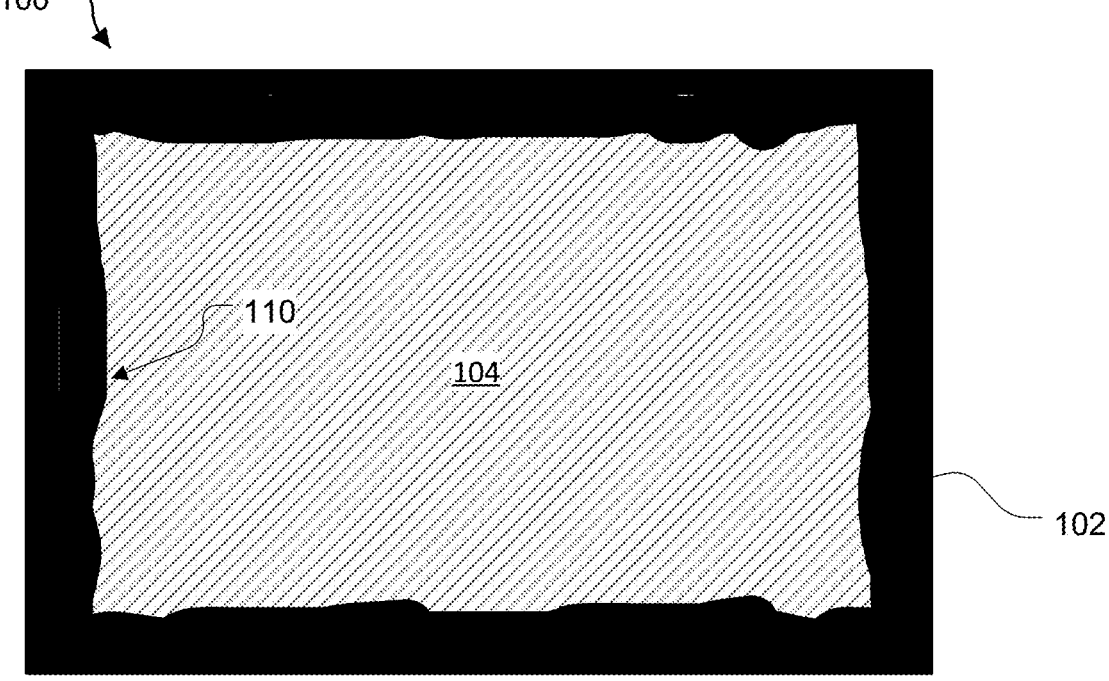
FIG. 4 is a schematic illustration of the back side of the mirror of FIG. 3 showing an overspray application of paint in accordance with disclosed embodiments.

FIG. 3 is a schematic, front-side view of a mirror 100 with an integral frame 108 in accordance with disclosed embodiments. Once exposed portion 106 has been formed, it may be painted or otherwise decorated or filled-in to form an integral frame 108 around the edge of mirror 100. As those of skill in the art having the benefit of this disclosure would appreciate, integral frame 108 may be formed by applying paint or other decorative material to the rear surface of the mirror 100 and the paint or decorative material is chosen so as to not show through the reflective layer 104. In this manner the paint or decorative material may be quickly applied by spraying, rolling, brushing, pouring, or otherwise covering the back surface of exposed portion 106 without concern for it showing through the reflective layer 104. When viewed from the front side, as shown in FIG. 3, only the crisp edged border will be visible and acts as an integral frame 108 feature of the mirror 100. FIG. 4 is a schematic illustration of the back side of the mirror 100 of FIG. 3 showing an overspray application of paint 110 in accordance with disclosed embodiments.

As those of skill in the art having the benefit of this disclosure would understand, any shape, size, color, pattern, or the like, may be used to create integral frame 108. By way of non-limiting example, FIG. 5 shows a frame-within-a-frame style with a first integral frame 108A and a second integral frame 108B formed in mirror 100, FIG. 6 shows a oval mirror 100 with a different color and/or pattern for integral frame 108, and FIG. 7 shows an embodiment where mirror 100 and integral frame 108 are different shapes. As would also be apparent to those of skill in the art having the benefit of this disclosure, one or more edges of mirror 100 may be beveled, rounded, scalloped, chipped, flat polished, pencil polished, chamfered, or the like, and mirror 100 may be a segmented (e.g., paned) mirror, or the like.

Although various embodiments have been shown and described, the present disclosure is not so limited and will be understood to include all such modifications and variations would be apparent to one skilled in the art.

Figure 8:
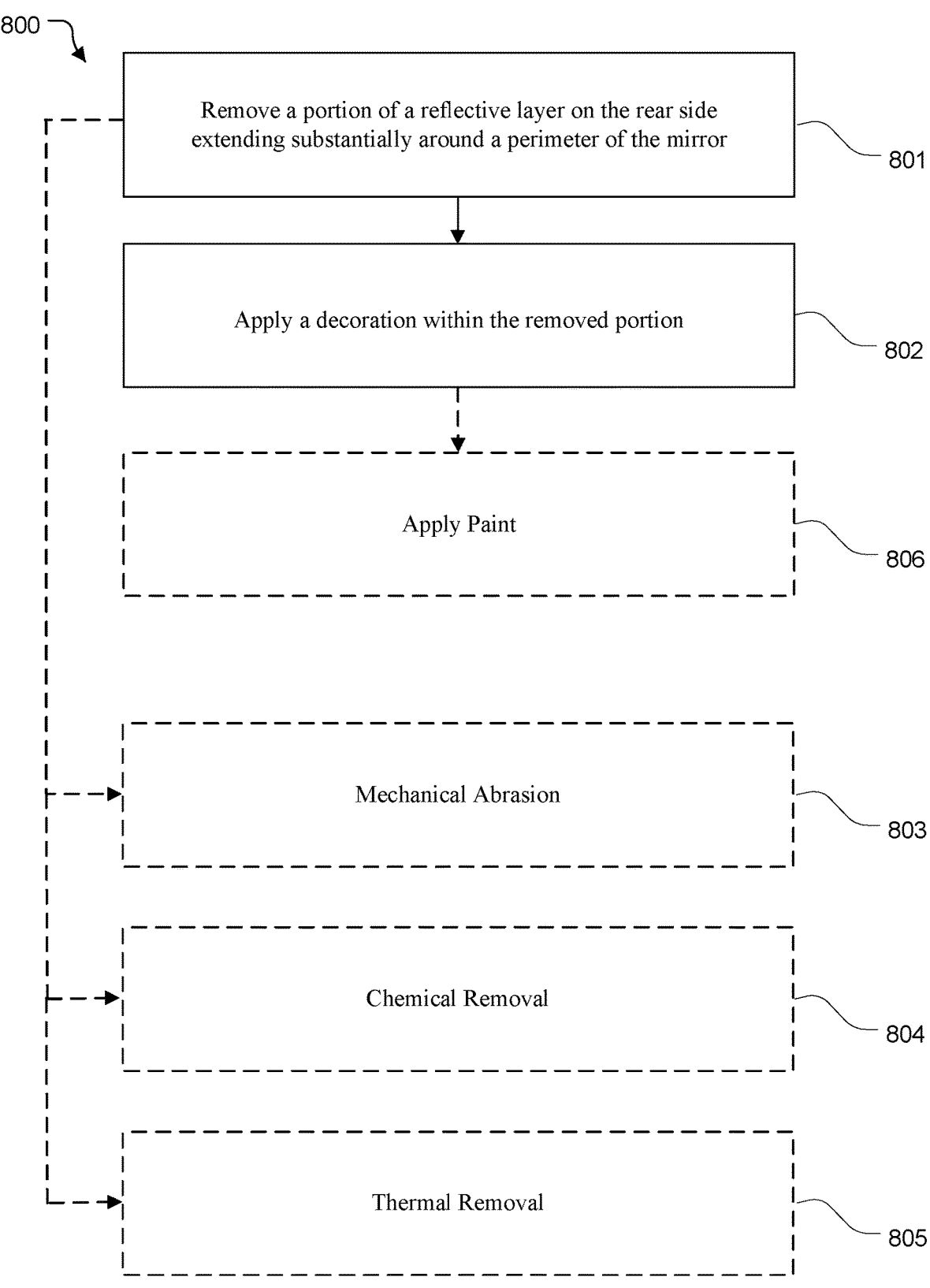
FIG. 8 is a schematic flow chart illustrating methods of making a mirror with an integral frame in accordance with disclosed embodiments.

FIG. 8 is a schematic flow chart illustrating methods of making a mirror with an integral frame in accordance with disclosed embodiments. As shown, the methods 800 include, at 801, removing a portion of a reflective layer on the rear side of a mirror, wherein the removed portion extends substantially around a perimeter of the mirror and, at 802, applying a decoration within the removed portion of the reflective layer.

In some embodiments the step 801 of removing the portion of the reflective layer may optionally include, at 803, mechanically abrading a portion of the reflective layer from the rear side of the mirror.

In some embodiments the step 801 of removing the portion of the reflective layer may optionally include, at 804, chemically removing a portion of the reflective layer from the rear side of the mirror.

In some embodiments the step 801 of removing the portion of the reflective layer may optionally include, at 805 thermally removing a portion of the reflective layer from the rear side of the mirror.

In some embodiments the step 802 of applying a decoration may optionally include, at 806, applying paint.

What is claimed is:

1. A method of making an integral frame mirror, the method comprising:
 removing a portion of a reflective layer on the rear side of a mirror, wherein the removed portion extends substantially around a perimeter of the mirror; and
 applying a decoration within the removed portion of the reflective layer.

2. The method of claim 1 wherein the step of removing the portion of the reflective layer further comprises mechanically abrading a portion of the reflective layer from the rear side of the mirror.

3. The method of claim 1 wherein the step of removing the portion of the reflective layer further comprises chemically removing a portion of the reflective layer from the rear side of the mirror.

4. The method of claim 1 wherein the step of removing the portion of the reflective layer further comprises thermally removing a portion of the reflective layer from the rear side of the mirror.

5. The method of claim 1 wherein the step of applying a decoration comprises applying paint.

* * * * *